G. W. MITCHELL.
Machines for Steaming and Washing Cakes and Crackers.

No. 154,886. Patented Sept. 8, 1874.

WITNESSES:
G. Mathis
John Kenion

INVENTOR:
Geo. W. Mitchell
BY
ATTORNEYS.

UNITED STATES PATENT OFFICE.

GEORGE W. MITCHELL, OF BALTIMORE, MARYLAND, ASSIGNOR TO HIMSELF, C. F. BENCHOFF, AND JOS. E. TYLER, OF SAME PLACE.

IMPROVEMENT IN MACHINES FOR STEAMING AND WASHING CAKES AND CRACKERS.

Specification forming part of Letters Patent No. 154,886, dated September 8, 1874; application filed July 10, 1874.

*To all whom it may concern:*

Be it known that I, GEORGE W. MITCHELL, of Baltimore city and State of Maryland, have invented a new and Improved Combined Cake Steaming and Washing Machine; and I do hereby declare that the following is a full, clear, and exact description of the same, reference being had to the accompanying drawing forming a part of this specification, in which—

Figure 1:
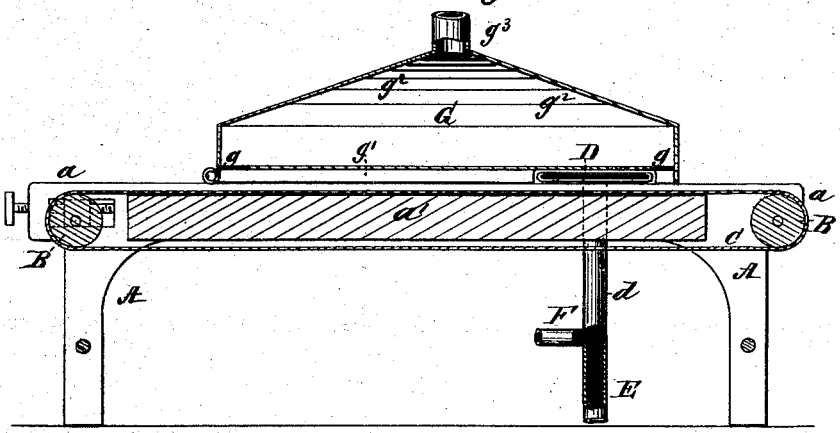
Figure 2:
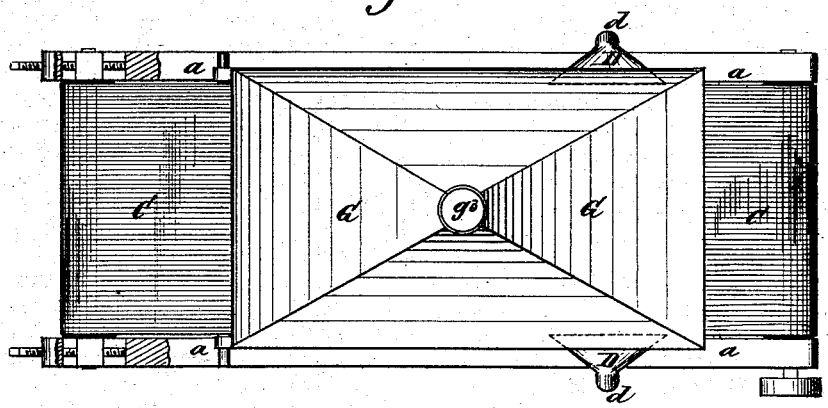
Figure 3:
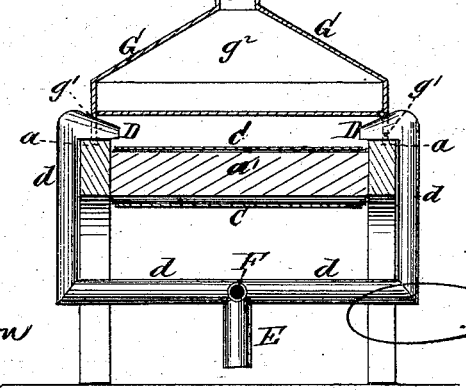

Figure 1 is a longitudinal sectional elevation, Fig. 2 a plan view, and Fig. 3 a cross-section.

The invention relates to the preparation of crackers and cakes, so as to remove all cohering flour-dust or discoloring matter and give them a cleaned, polished, and attractive appearance.

The means by which this is accomplished will first be fully described, and then pointed out in the claim.

A represents a table, whose sides $a\ a$ project upward so as to form a guide on each side of platform or pan-support $a'$. At each end of this table I journal a roll, B, and pass an endless apron, C, around both table and rolls, so that a revolution of the latter will carry along the apron with the cracker or cake pans. D D are steam-ejecting nozzles oppositely placed over the platform $a'$, and connected, by pipes $d\ d$, with a steam-supply pipe, E. In connection with this I use a water-supply pipe, F, to moisten the steam with aqueous spray or vapor when it is too dry. G is a steam box or cover hinged to the sides $a\ a$ of table, provided with openings $g\ g$ near the ends, downward flanges $g^1\ g^1$ on the sides, and a dome, $g^2$, with an outlet-pipe, $g^3$.

The operation is as follows: This machine being attached to any of the modern cutting-machines used by bakers, the pans of cakes or crackers are delivered therefrom on the endless apron C, which carries them under the steam-box G and between the nozzles D D. The nozzles, as the cakes or crackers are passing along, impinge an oblique stream of moist steam against their upper surfaces, thereby not only taking up the minute particles of flour or other adhering matter, but polishing and beautifying their appearance to a remarkable degree. This very desirable object is thus secured without handling the cakes or crackers, and without injury to the pans. The steam escaping through holes $g$ into the dome $g^2$ is discharged through outlet $g^3$.

Having thus described my invention, what I claim as new is—

The combination, with table A, having upward-projecting sides $a\ a$ and platform $a'$, of the movable endless apron C, steam-ejecting nozzles D D, and steam box or cover G, as and for the purpose specified.

GEORGE W. $\overset{\text{his}}{\times}$ MITCHELL.
<span style="margin-left:3em">mark.</span>

Witnesses:
W. H. HAYWARD,
C. F. BENCHOFF.